Patented July 15, 1952

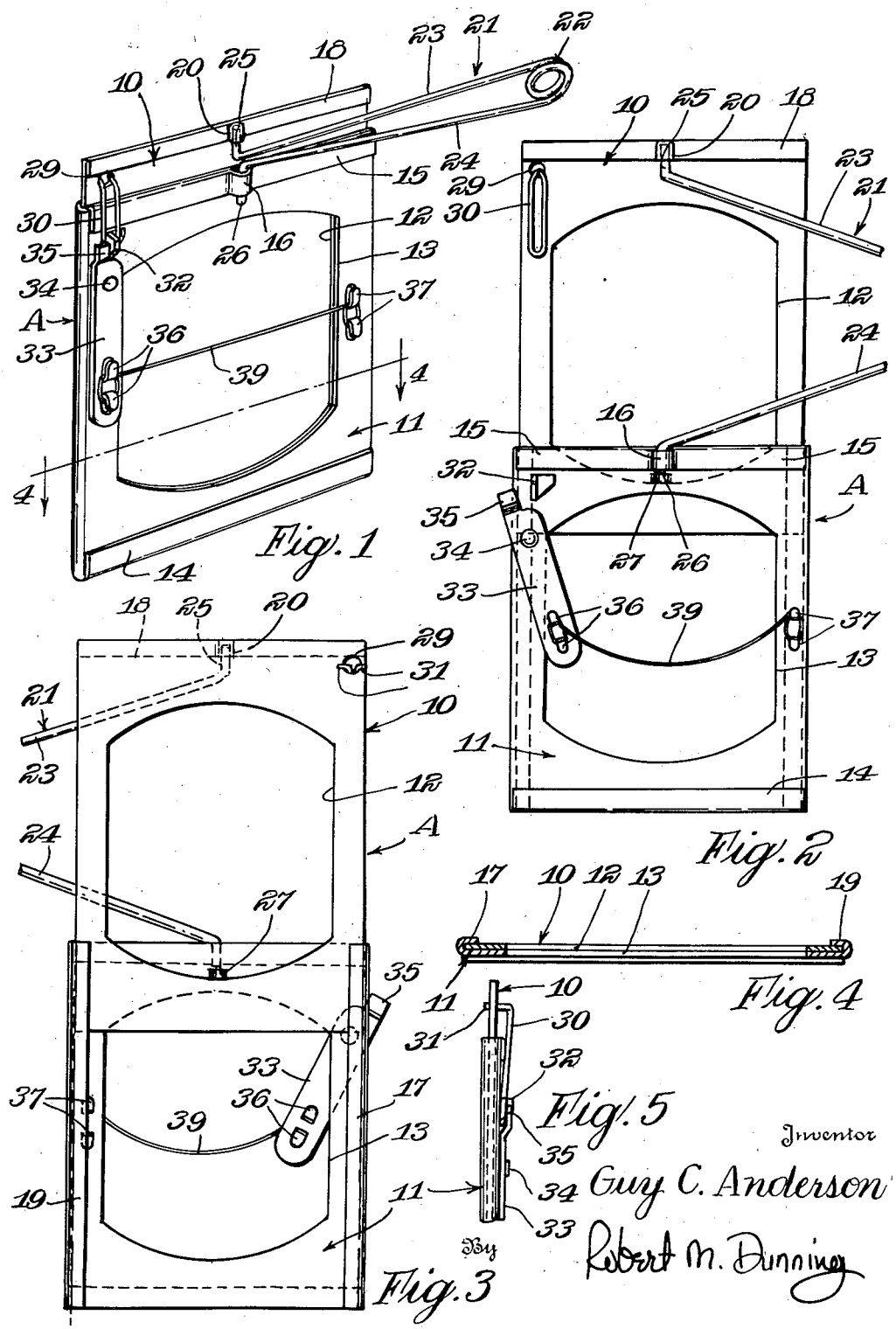

2,603,029

UNITED STATES PATENT OFFICE 2,603,029

ANIMAL TRAP

Guy C. Anderson, St. Paul, Minn.

Application August 13, 1948, Serial No. 44,189

9 Claims. (Cl. 43—85)

My invention relates to an improvement in animal traps and deals particularly with a trigger actuated trap for killing moles and other animals.

The object of the present invention lies in the provision of a trap which is of simple construction and which may be manufactured at a low cost. The device may be mainly constructed of sheet metal or other similar material which may be punched and formed at a low cost. At the same time, my trap is extremely sensitive and is most effective in operation.

A feature of the present invention lies in the provision of a trap having a pair of relatively slidable plates arranged in face to face relation. Openings are provided through the plates through which the animal may pass. A spring urges the plates in a manner to move the openings out of registry, thus killing the animal as the plates slide apart.

A feature of the present invention lies in the provision of an extremely sensitive trigger arrangement. The trigger comprises a loop which is mounted on one plate and is engaged about an inclined catch on the other plate. A lever is provided to hold the loop thus engaged. As soon as the lever is pivoted out of loop engaging position the spring urging the plates apart will disengage the loop from the inclined catch and allow the plates to separate.

An added feature of the present invention lies in the provision of a trigger which is operated by a lever in such a manner that but a small amount of force is required to actuate the trigger. As a result the trap is extremely sensitive in its action.

An added feature of the present invention lies in the specific type of spring used for urging the plates in one direction. The spring comprises a spring loop having arms extending from opposite ends thereof. These arms terminate in off-set bent ends which extend through bearings in the plates. In view of the fact that these bearings are vertically aligned on the two plates, the spring may be swung into a position substantially parallel with the plates or into a position at virtually right angles to the plates. This is important as it is not always possible to have the spring project from the trap in the same direction.

These and other objects and novel features of my invention will be more clearly and fully set forth in the following specification and claims.

In the drawings forming a part of my specification:

Figure 1 is a perspective view of my trap in readiness for operation.

Figure 2 is an elevation view of the trap with the plates sprung apart so that the openings therein are moved out of registry.

Figure 3 is a view similar to Figure 2 showing the opposite side of the trap.

Figure 4 is a sectional view through the trap on the line 4—4 of Figure 1.

Figure 5 is a side elevation view of a portion of the trap showing the trigger loop and lever arrangement.

The trap A may be used in any desired location and is ordinarily placed in the path of movement of an animal either travelling through a passage beneath the surface of the ground, through a hole, or the like. The trap includes a pair of relatively slidable plates indicated in general by the numerals 10 and 11. These plates are registerable with the openings 12 and 13, respectively, extending therethrough, the opening being of sufficient size to permit the animal to easily pass therethrough.

The plate 11 preferably includes a bottom flange 14 which is folded upwardly against the outer surface of the plate 11 to reinforce and strengthen the plate laterally. The plate 11 is likewise provided with a top flange 15 which is bent downwardly to overlie a portion of the top edge of the plate 11 to reinforce the same. The flange 15 is provided with an outwardly bent central loop portion 16 which may act as a bearing for one end of the spring as will be later described.

As best illustrated in Figures 3 and 4 of the drawings the vertical side edges of the plate 11 are equipped with flanges 17 and 19 which are bent forwardly and then parallel to the body of the plate 11. The space between the body of the plate 11 and the flanges 17 and 19 is just sufficient to admit the plate 10 therebetween. Thus the flanges 17 and 19 form slight channels for the plate 10 in its vertical slidable movement.

The plate 10 is provided with a reinforcing flange 18 along its upper edge having a pocket 20 therein which is bent from the body of the flange near the center thereof and may serve as a bearing for an end of the spring. The pocket 20 is vertically longitudinally aligned with the loop 16 so that the ends of the operating spring may be substantially aligned.

The operating spring is indicated in general by the numeral 21. This spring is provided with a spring loop 22 which terminates in a pair of arms 23 and 24 which are normally urged into diverging relation. The extremities 25 and 26 of these arms 23 and 24 extend into the pocket 20 and through the loop 16 respectively. The tension upon the spring arms 21 and 24 keeps the ends engaged in the loops at all times. Thus the plates 10 and 11 are normally urged toward the position illustrated in Figures 2 and 3 of the drawings. A projecting loop of metal 27 on the upper portion of the plate 11 extends into the aperture 12 of the plate 10 and limits the separation of the two plates. The spring 21 is still under strain when the plates are in the extreme position illustrated in Figures 2 and 3 so that the spring remains engaged in the loops 20 and 26.

The plate 10 is provided with an aperture 29 near its upper extremity and near one side edge thereof. A wire loop 30 is provided with rearwardly turned ends which extend through the aperture 29 and then extend laterally to form anchoring ends 31 as illustrated in Figure 3. The loop 30 is thus pivotally connected to the plate 10 and normally depends from the aperture 29.

A tapered projecting lug 32 is struck from the body of the plate 11 near its upper extremity and in alignment with the aperture 29 of the plate 10. This lug 32 is provided with an upwardly and outwardly tapered lower edge over which the loop 30 may engage. The loop 30 is engageable over the lug 32 to hold the plates 10 and 11 in the position illustrated in Figure 1 with the openings 12 and 13 thereof in registry. In order to hold the loop 30 in place upon the lug 32 I provide a lever 33 which is pivoted to the plate 11 at 34 near its upper end. The upper end of the lever 33 is off-set as indicated at 35 so as to extend over the loop 30 when the loop is engaged on the lug 32. As long as the lever 35 is in the position shown in Figure 1 of the drawings with the off-set end 35 against the lug 32 the loop 30 is held upon this lug. However, as soon as the lever 33 is pivoted in a counter-clockwise direction as viewed in Figure 1, the spring 21 will urge the plates 10 and 11 apart, the loop 30 sliding over an inclined lower edge of the lug 32.

A pair of oppositely directed ears 36 are struck from the lever 33 to form a cleat. A similar pair of ears 37 are struck from the plate 11 on the opposite side of the opening 13 from the lever 33. A trigger string or wire 39 extends between the cleats 36 and 37, thus extending across the registered openings at approximately their center point. The space above and below the string or wire 39 is not sufficient for the animal to pass.

When the trap is placed in the path of movement of the animal and is set as indicated in Figure 1 of the drawings, it is in readiness for operation. When an animal passes through the aligned opening 12 and 13, the trip cord 39 is deflected, swinging the lever 33 in a counter-clockwise direction as viewed in Figure 1. As soon as the off-set end 35 of the lever 33 has swung out of the path of the loop 30, the spring 21 acts to slide the plates 10 and 11 toward the position illustrated in Figures 2 and 3 of the drawings, thus engaging the animal between the two plates. As the spring 21 possesses considerable strength this movement tends to kill the animal immediately when the trap is sprung, thereby preventing painful injury to the animal and allowing the animal to escape after being wounded.

In accordance with the patent statutes, I have described the principles of construction and operation of my animal trap and while I have endeavored to set forth the best embodiment thereof, I desire to have it understood that obvious changes may be made within the scope of the following claims without departing from the spirit of my invention.

I claim:

1. A trap including a pair of relatively slidable plates having openings therethrough which are in registry in the set position of the trap, a spring for urging said plates toward a position with the openings out of registry, trigger means for holding said plates with the openings in registry, said trigger means including a loop on one of the plates, a lug on the other of said plates over which said loop engages, means for holding said loop engaged with said lug, and means for actuating said loop holding means to release the loop from said lug.

2. The structure described in claim 1 where the loop holding means comprises a pivoted lever.

3. A trap including a pair of relatively slidable elements having elements therethrough which are in registry in the set position of the trap, said openings being movable into a position wherein the openings are out of registry, resilient means urging said elements toward said position, trigger means holding said elements with said openings in registry, said trigger means including a loop connected to one of said elements, a lug having an inclined edge on the other of said elements designed for engagement in said aperture, and means for holding the loop engaged with said inclined edge on said lug, and means for actuating said loop holding means to release the loop from said lug.

4. The structure described in claim 3 in which the loop holding means comprises a pivoted lever.

5. A trap including a pair of relatively slidable plates having openings therethrough which are in registry in the set position of the trap, resilient means urging said plates to a position with the openings out of registry, trigger means for holding said plates with the openings in registry, said trigger means including a loop hingedly supported by one of said plates, a lug having an inclined surface engageable with the end of said loop, said inclined surface tending to direct the closed end of the loop out of engagement with the lug, means for holding said loop upon said lug, and means for actuating said loop holding means to release the loop from said lug.

6. The structure described in claim 5 in which the loop holding means comprises a pivoted lever.

7. An animal trap including a pair of relatively slidable plates having openings therethrough which are in registry in the set position of the trap, spring means for urging said plates toward a position with the openings out of registry, said spring means having a looped end, a pair of normally diverging arms and oppositely projecting ends on said arms, said plates having substantially axially aligned sockets, the ends of the arms being pivotally engaged in said sockets.

8. A trap including a pair of relatively slidable plates having openings therethrough which are in registry in the set position of the trap, resilient means urging said plates to a position with the openings out of registry, trigger means for holding said plates with the openings in registry, said trigger means including a loop hingedly supported by one of said plates, a lug on the other plate having an inclined surface engageable with the end of said loop, said inclined surface tending to direct the closed end of the loop out of engagement with the lug, a pivoted lever mounted for engaging one side of said lug to hold the loop on said lug, and flexible means connected adjacent one end of said lever and extending across said openings when said openings are in registry to thereby pivot said lever and release said loop when said flexible means is contacted by an animal.

9. A trap including a pair of relatively slidable plates having openings therethrough which are in registry in the set position of the trap, a spring for urging said plates toward a position with the openings out of registry, projecting means on one of said plates provided with an inclined surface, pivotal means carried by the other plate provided with an opening adjacent one end engageable with the inclined surface on said projecting means to maintain said plate openings in registry, and means engageable with said pivotal means for holding said pivotal means and its opening in engagement with said inclined surface, and means for releasing said pivotal means to thereby permit disengagement of said pivotal means from said projecting means and concomitant relative movement of said plates to the position with their openings out of registry by the action of said spring.

GUY C. ANDERSON.

REFERENCES CITED

The following references are of record in the file of this patent:

UNITED STATES PATENTS

| Number | Name | Date |
| --- | --- | --- |
| 655,995 | Rittenhouse et al. | Aug. 14, 1900 |
| 1,294,293 | Margo | Feb. 11, 1919 |
| 1,359,724 | Mosby | Nov. 23, 1920 |
| 1,458,330 | Gallagher | June 12, 1923 |
| 2,460,417 | Goostrey | Feb. 1, 1949 |